United States Patent

[11] 3,617,754

| [72] | Inventor | Bernard P. Hildebrand<br>Richland, Wash. |
| [21] | Appl. No. | 782,582 |
| [22] | Filed | Dec. 10, 1968 |
| [45] | Patented | Nov. 2, 1971 |
| [73] | Assignee | Holotron Corporation<br>Wilmington, Del. |

[54] SCANNED OBJECT HOLOGRAPHY
9 Claims, 7 Drawing Figs.

[52] U.S. Cl............................................. 250/216,
178/6.5, 350/3.5
[51] Int. Cl........................................................ G02b 27/22
[50] Field of Search............................................ 350/3.5;
178/6.5; 250/216, 219

[56] References Cited
UNITED STATES PATENTS
3,400,363  9/1968  Silverman.................... 350/3.5 X
OTHER REFERENCES Kock, Proceedings of the IEEE, Vol. 56 No. 2, pp. 238–239 (2/1968).

Neumann, J. Opt. Soc. Am., Vol. 58 No. 4, pp. 447– 454 (4/1968).

Primary Examiner—David Schonberg
Assistant Examiner—Robert L. Sherman
Attorney—Woodcock, Washburn, Kurtz & Mackiewicz ABSTRACT: A technique for constructing a hologram by scanning an object relative to a fixed source and receiver. The object motion is restricted either relative to the source radiation or relative to the receiver in a manner to allow construction of an ordinary hologram from which the usual type of images may be reconstructed.

3,617,754

SCANNED OBJECT HOLOGRAPHY

BACKGROUND OF THE INVENTION

This invention relates to an improved technique in the art of holography and more particularly to that type of holography in which scanning techniques are employed.

The basic technique in off-axis holography will be briefly described. As disclosed in copending patent application Ser. No. 361,977, filed Apr. 23, 1964, now Pat. No. 3,506,327 two coherent radiation beams are brought together with a finite angle therebetween at a radiation detector to from an interference pattern thereon. For optical holography, the radiation is within the visible region and the detector is usually photographic film which records the interference pattern between the two light radiation beams. One light beam is modified by the object scene to be recorded and the other light beam serves as a reference beam. After exposure and development of the photographic film, it is illuminated with a light beam similar to the reference beam used in constructing the hologram. The reconstructing light beam is diffracted by the recorded interference pattern into at least one diffracted beam which carries information of the object scene for viewing. An image of the object scene is so viewed in full three dimensions including parallax effects as if the object scene itself were being viewed.

A further recent improvement in the art of holography involves the use of compressional wave energy in the ultrasonic range and is described in Pat. application Ser. No. 596,914, filed Aug. 3, 1966. Two coherent ultrasonic beams are caused to interfere with each other at an ultrasonic detector illuminated with light to view in the optical domain a full three-dimensional representation of the object scene as viewed by ultrasonic energy. One ultrasonic beam is modified by the object scene and the other serves as a reference beam.

A more recent development in the art of holography involves scanning a substantially point receiver relative to an object scene over a surface where an interference pattern from two radiation beams exists. The received radiation is typically converted to an electrical signal which modulates the intensity of a point light source which is scanned over a photographic film simultaneously with scanning the receiver over its surface. Furthermore, the reference radiation beam may be eliminated and simulated electronically by a predetermined electrical waveform being mixed with the electrical signal output of the scanning receiver. After the photographic film is fully exposed and developed, images may be holographically reconstructed therefrom in the normal manner. A system of scanned receiver holography used with ultrasonic radiation is described by Preston and Kreszer in *Applied Physics Letters*, Mar. 1, 1967, Vol. 10, No. 5, page 150.

It has also been found that instead of scanning a receiver over a holographic aperture, the object scene illuminating source may itself be scanned over an area relative to an object scene. A substantially point receiver remains fixed relative to the object scene. Such a technique is described more fully in copending Pat. application Ser. No. 662,736, filed Aug. 23, 1967. In both the scanned receiver and the scanned source techniques described above with reference to the publication and patent application, respectively, holograms are constructed which have the same characteristics as those produced by the basic nonscanned off-axis holographic techniques described above with reference to copending Pat. application Ser. No. 361,977 and Ser. No. 596,914.

In certain cases, it may be undesirable to produce a hologram according to the scanned techniques because it is inconvenient to scan or the receiver. Therefore, it is an object of this invention to provide a technique for producing a hologram with a substantially point source and receiver without having to scan either the source of receiver over a hologram aperture.

Furthermore, it is a primary object of this invention to construct a hologram of ordinary characteristics of an object scene moving with respect to a radiation source and receiver.

SUMMARY OF THE INVENTION

These and additional objects of this invention are accomplished by a technique wherein the source and receiver remain fixed relative to one another while an object scene is scanned over an area whose surface has a center of curvature at either the apparent point radiation source or the substantially point radiation receiver.

For a more detailed disclosure of the invention and for further objects and advantages thereof, reference should be had to the following description taken in conjunction with the accompanying drawings.

DESCRIPTION OF THE PREFERRED EMBODIMENTS

Figure 1:
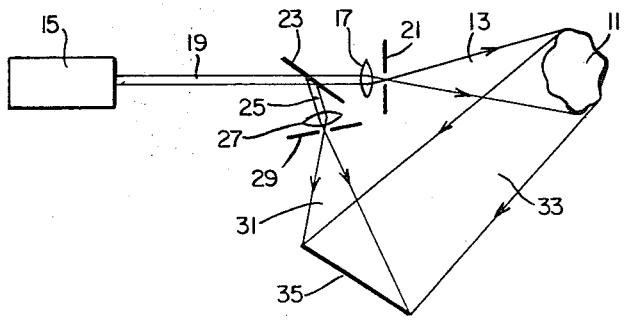
FIGS. 1 and 1A illustrate the technique of ordinary holography in the optical domain.

Referring to FIG. 1, a basic technique of optical holography will be briefly reviewed. An object scene 11 is illuminated by a coherent light beam 13 which is most easily obtained from a laser light source 15 with a lens 17 in its narrow light beam 19 and a pinhole filter 21 placed at the focal plane of the lens 17. A beam splitter 23 reflects part of the light of the beam 19 into another beam 25 in which a lens 27 and pinhole filter 29 are placed to give a good spherical wave front reference light beam 31. Light reflected from the object scene 11 in the form of an object modified beam 33 is captured by a detector such as photographic film 35. The reference beam 31 also illuminates the film 35 while intersecting with the object-bearing beam 33 at a finite angle therewith and forms an interference pattern between the two beams which is recorded on the film. The object scene 11 is shown here to be of the reflective type but it is to be understood that transmittive objects may also be the subjects of a hologram.

Figure 1A:
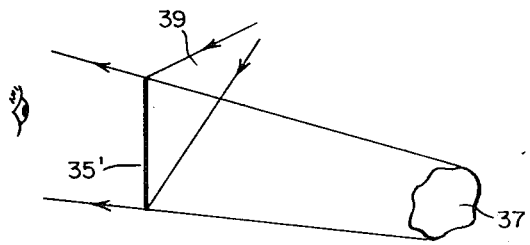

After development of the film 35, an image 37 (FIG. 1A) may be reconstructed from the hologram 35' upon illumination by a reconstructing light beam 39 which preferably has the same curvature as the reference beam 31 and further strikes the hologram 35' at the same angle at which the reference beam 31 struck the photographic film 35 during construction. The reconstructing light beam 39 is diffracted into at least one image carrying beam. In FIG. 1A, an observer's eye is shown in a diffracted beam wherein light from an image appears to be coming from behind the hologram 35'. If the wavelength of the reconstructing light beam 39 is the same as was used in constructing the hologram and if the curvature of the light beam wave front is similar to that of the reference beam 31 and if it strikes the hologram at the same angle as the reference beam, the images 37 will be the same size and at the same position relative to the hologram as was the object scene 11 during construction thereof. As the wavelength or radius of curvature of the reconstructing light beam 39 is altered, the image 37 will be magnified or demagnified and its position relative to the hologram 35' will be changed.

Figure 2:
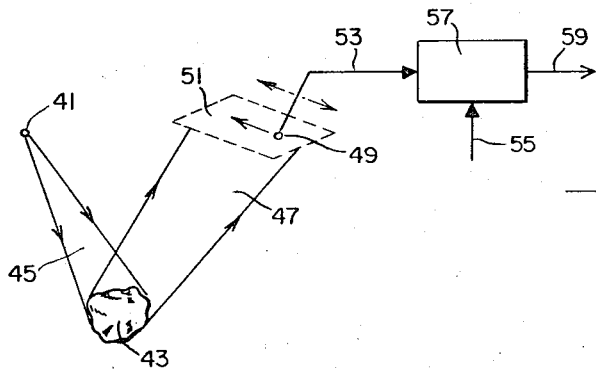
FIG. 2 schematically illustrates receiver scanning in holography.

A further development in holography is shown in FIG. 2 wherein a point radiation receives is scanned over an area. An effective point radiation source 41 illuminates an object scene 43 with an object beam of radiation 45, which is reflected and diffracted by the object in the form of an object-modified beam 47. A radiation receiver 49, such as a quartz transducer for ultrasonic compressional radiation, us substantially a point (only a very few wavelengths in diameter) and scanned over a plane area 51. An electrical connection 53 carries from the receiver an electrical signal proportional to the radiation incident thereon. This electrical signal is utilized to modulate the intensity of a light source which is scanned across a photographic film to construct a permanent hologram. Although a reference beam coherent with the object beam 45 could be interfered with the object-bearing beam 47 in the scanned receiver process, it is preferable in certain circumstances, as shown in FIG. 2, to electronically simulate this reference beam. A reference signal 55 coherent with the object beam 45 is mixed with the receiver output signal 53 in an appropriate type of known electronic mixing unit 57 to produce holographic information at the output terminal 59. It has been found that a phase detector is the preferable mixing unit 57. A phase shifting circuit must be placed in the path of reference signal 55 under certain circumstances to obtain off-axis holographic information. This holographic output signal may them modulate the intensity of a substantially point light source which is scanned across a photographic film in synchronism with the scanning of the receiver 49, thereby to produce a permanent hologram. The hologram so constructed is capable of reconstructing an image of the object 43 as if a holographic detector such as photographic film were placed in the scanned area 51 and illuminated with the object-bearing beam 47 and an appropriate reference beam.

Figure 3:
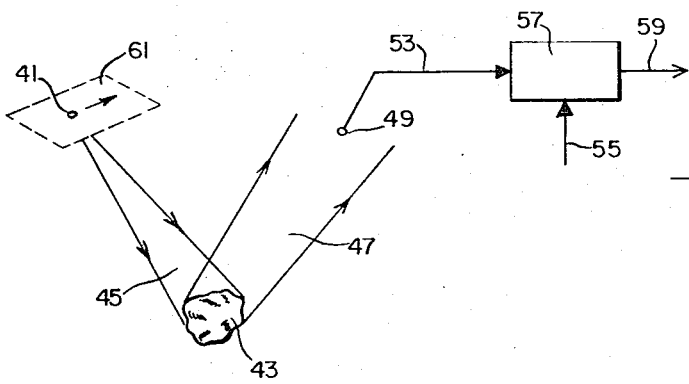
FIG. 3 schematically illustrates source scanning in holography.

In some situations it may be difficult or impractical to scan the receiver over an area and it has been found that the source 41 may be scanned over an area relative to the object 43 and the receiver 41 held constant relative to the object, as illustrated in FIG. 3. The source 41 is here scanned in some convenient manner over an area 61, with a light source modulated in intensity by the electrical signal at the output 59 and scanned over a photographic film in synchronism with the scanning of the source 41. The resulting permanent hologram is capable of reconstructing an image of the object as viewed through the plane area 61 by ordinary techniques.

It will be understood that the aforementioned techniques of holography and those of the present invention whose description is to follow do not depend on the particular wave radiation utilized. The invention is applicable to the entire spectrum of electromagnetic radiation, including visible light, microwaves, infrared, ultraviolet, X-rays, radio waves, etc., and for all ranges of compressional or acoustic radiation including subsonic, sonic, supersonic, ultrasonic, hypersonic, and even phonons. The fundamental requirements for producing holographic information is that the wave radiation utilized must be coherent so that a specific wavelength can be defined. When such radiation is utilized, the object modified beam and the reference beam can be mixed together to produce an interference pattern which contains holographic information capable of reconstructing the original object modified beam and therefore images of the original object.

It should further be noted that modulated wave radiation may be used to produce the object modified beam. Such wave radiation, for example, may be visible light modulated at microwave frequencies or it may be ultrasonic radiation modulated at sonic frequencies.

It should also be pointed out that the particular type of receiver or detector will depend on the particular type of wave radiation utilized. For example, in the case of visible light radiation the receiver 49 would be some photosensitive device, whereas in the case of ultrasonic wave radiation the receiver 49 would most likely be a quartz transducer. In both the receiver and source-scanning technique as illustrated in FIGS. 2 and 3, respectively, the holographic information recorded is essentially the same as that recorded in the basic holographic technique as illustrated in the optical domain in FIG. 1.

The present invention provides a technique wherein the object scene is scanned relative to a source and a receiver which are stationary relative to each other. To obtain holographic information of an object from which an undistorted and unaberrated image of the object may be reconstructed, it has been found that the object must be scanned over a surface which has a particular relationship with either the source or the receiver. A scanned surface must have a center of curvature at the apparent point radiation source or at a substantially point radiation receiver.

Figure 4:
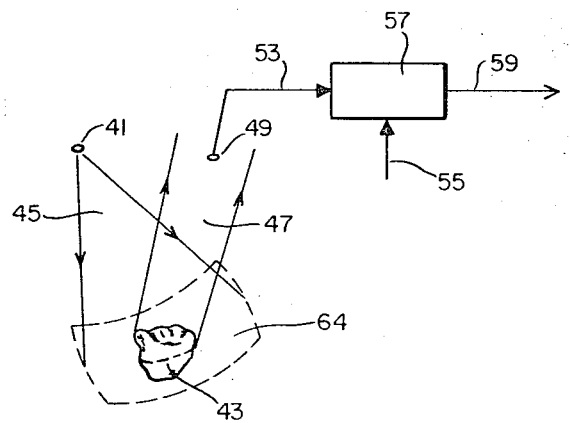
FIG. 4 illustrates schematically one embodiment of the present invention wherein the object scene is scanned in an area whose surface has a center of curvature at a substantially point source.

The embodiment of this invention wherein the object is scanned in a surface defined relative to a radiation source is illustrated in one form in FIG. 4, wherein the point source 41 and the point receiver 49 remain fixed relative to each other and the object scene 43 is scanned relative thereto. Any given point of the object scene 43 must travel in a path which is substantially a constant finite distance from the point radiation source 41 and thus over an area 64 which is a portion of a spherical surface having a center of curvatures at the radiation point source 41. All object scene points of interest must be scanned over similar spherical surfaces. To state the criterion for scanning another way, the scanned surface (and thus object motion) must always be substantially perpendicular at every point thereof to rays of the radiation beam 45.

To record a hologram, a light bulb whose intensity is modulated by the signal at the output 59 may be scanned over photosensitive material in synchronism with the object 43 being scanned over the area 64. If the bulb is scanned over a planar photosensitive surface, the image may be in some cases contain appreciable distortions and aberrations. To reconstruct a perfectly undistorted and unaberrated image, the scanning must be carried out over a spherical surface. The radius of this sphere is the distance from the point receiver 49 to the source 41. Furthermore, the scanning rate on this surface should be related to the scanning rate of the object plane 70 modified by the ratio of the distance from the source 41 to the receiver 49 over the distance from the source 41 to the object plane 70.

An approximate correction may be applied in the case where the bulb is scanned over a planar photosensitive material. An appropriate spherical lens may be used in the reconstruction step, or, alternatively, a reconstruction wave front of the appropriate sphericity may be employed.

Figure 5:
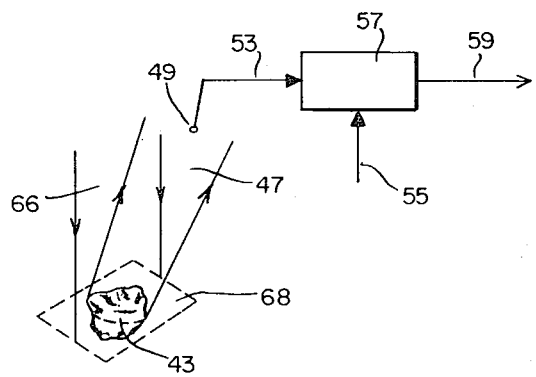
FIG. 5 illustrates in schematic form this invention wherein the radiation source produces a substantially collimated radiation beam and the object scene is scanned in a plane orthogonal to the object beam rays.

The embodiment of this invention wherein the object is scanned in a surface defined relative to a radiation source is illustrated in another form in FIG. 5 wherein the object 43 is scanned within a substantially collimated radiation beam 66 which remains stationary relative to the point receiver 49. All points of the object scene 43 should be scanned in a plane (such as plane 68) which is perpendicular to the rays of the radiation beam 66. The apparent point source of a collimated radiation beam is an infinite distance from the object, so a plane having a center of curvature at infinity is the required surface to be scanned according to this invention.

Figure 6:
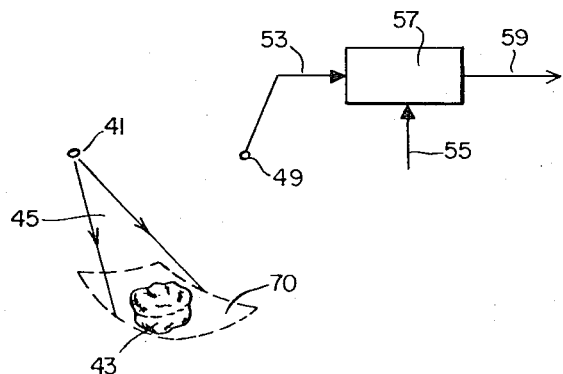
FIG. 6 illustrates schematically another embodiment of the present invention wherein the object scene is scanned in an area whose surface has a center of curvature at a substantially point receiver.

A second embodiment of this invention wherein the object is scanned in a surface defined relative to a radiation receiver 49 is illustrated in FIG. 6. The object scene 43 is scanned in an area 70 which is a portion of a spherical surface with a center of curvature at the substantially point radiation receiver 49. The area 70 is illuminated with a point radiation source as discussed hereinbefore. Ordinary holographic information of the object scene 43 is obtained by this embodiment of the inventive technique.

More generally, the techniques of this invention demonstrate that in addition to source or receiver scanning, object scanning may be utilized to give holographic information which may be recorded and an image of the object scene reconstructed with fidelity. It may be noted that the disclosure and claims of copending application Ser. No. 744,732 filed July 15, 1968, pertain to a technique of simultaneous source and receiver scanning relative to an object scene. A discovery reported therein is the general recognition that several types of useful information of the object scene may be obtained by such relative motion. In an embodiment of the invention there disclosed wherein the source and receiver are locked together and scanned relative to the object in a plane surface, the information obtained is not that of ordinary holography, at it is here, but gives different information as to the object scene scanned.

It shall be understood the invention is not limited to the specific arrangements shown, and modifications may be made within the scope of the appended claims.

What is claimed is:

1. A method of producing holographic information of an object scene, including the steps of:
   illuminating the object scene with a coherent radiation beam which appears to originate from a point source,
   positioning a substantially point radiation receiver to receive the object-illuminating radiation after modification by the object scene, and
   scanning each illuminated point of the object scene over a spherical surface area having a center of curvature at either the apparent point source or the substantially point radiation receiver, mixing a reference signal coherent with the source radiation with the object-modified radiation striking the receiver, thereby producing holographic information of the scene.

2. A method of producing holographic information of an object scene including the steps of:
   illuminating the object scene with a coherent radiation source,
   positioning a substantially point radiation receiver fixed relative to the radiation source to receive radiation from the source after modification by the object scene,
   scanning each illuminated point of the object scene over an area of a surface substantially perpendicular to rays of the object illuminating radiation incident upon the surface, and
   mixing a reference signal coherent with the source radiation with the object-modified radiation striking the receiver, thereby producing holographic information of the object scene.

3. The method according to claim 2 wherein the step of illuminating the object scene includes illuminating said object with a collimated radiation beam, and wherein the step of scanning each illuminated point of the object scene includes scanning said object scene in a plane surface.

4. A method according to claim 2 wherein the step of illuminating the object scene by a coherent radiation source includes illuminating the object scene by a source of electromagnetic energy.

5. A method according to claim 2 wherein the step of illuminating the object scene by a coherent radiation source includes illuminating the object scene with a source of compressional wave energy.

6. A method of producing holographic information of an object scene including the steps of:
   illuminating the object scene with a coherent radiation source,
   positioning a substantially point radiation receiver fixed relative to the radiation source to receive radiation from the source after modification by the object scene,
   scanning each illuminated point of the object scene over a spherical surface area having a center of curvature at the substantially point radiation receiver, and
   mixing a reference signal coherent with the source radiation with the object-modified radiation striking the receiver, thereby producing holographic information of the object scene.

7. The method according to claim 6 wherein the object scene is illuminated by a source of compressional wave energy.

8. A method of producing holographic information of an object scene including the steps of:
   illuminating the object scene with an apparent point coherent radiation source positioned a finite distance from the object scene,
   positioning a substantially point radiation receiver fixed relative to the radiation source to receive radiation from the source after modification by the object scene,
   scanning each illuminated point of the object scene over a spherical surface area having a center of curvature at the substantially point radiation receiver, and
   mixing a reference signal coherent with the source radiation with the object-modified radiation striking the radiation receiver thereby producing holographic information of the object scene.

9. The method according to claim 8 wherein the object scene is illuminated by a source of compressional wave energy.

* * * * *